(12) United States Patent
Pitt et al.

(10) Patent No.: US 8,534,611 B1
(45) Date of Patent: *Sep. 17, 2013

(54) MOVEABLE LEADING EDGE DEVICE FOR A WING

(75) Inventors: Dale M. Pitt, Affton, MO (US); Nicholas Stephen Eckstein, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 866 days.

This patent is subject to a terminal disclaimer.

(21) Appl. No.: 12/505,065

(22) Filed: Jul. 17, 2009

(51) Int. Cl.
*B64C 3/50* (2006.01)

(52) U.S. Cl.
USPC .......................... 244/214; 244/216; 244/217

(58) Field of Classification Search
USPC .................. 244/1 N, 99.8, 214, 217, 219
See application file for complete search history.

(56) References Cited

U.S. PATENT DOCUMENTS

| | | | |
|---|---|---|---|
| 3,711,039 A | 1/1973 | James | |
| 4,171,787 A * | 10/1979 | Zapel | 244/219 |
| 4,252,287 A * | 2/1981 | Zimmer | 244/219 |
| 4,399,970 A | 8/1983 | Evans | |
| 4,650,140 A | 3/1987 | Cole | |
| 4,915,327 A | 4/1990 | Ellmers et al. | |
| 5,094,411 A | 3/1992 | Rao | |
| 5,150,864 A * | 9/1992 | Roglin et al. | 244/219 |
| 5,222,653 A | 6/1993 | Joyce et al. | |
| 5,544,847 A | 8/1996 | Bliesner | |
| 5,681,013 A | 10/1997 | Rudolph | |
| 5,686,003 A * | 11/1997 | Ingram et al. | 219/201 |
| 5,839,699 A | 11/1998 | Bliesner | |
| 5,927,656 A * | 7/1999 | Hinkleman | 244/203 |
| 6,328,265 B1 | 12/2001 | Dizdarevic | |
| 6,435,458 B1 | 8/2002 | Bliesner | |
| 6,536,714 B2 | 3/2003 | Gleine et al. | |
| 6,682,023 B2 | 1/2004 | Broadbent | |
| 6,974,112 B2 | 12/2005 | Broadbent | |
| 7,753,316 B2 * | 7/2010 | Larssen et al. | 244/199.4 |
| 7,766,281 B2 | 8/2010 | Lorkowski et al. | |
| 8,191,835 B2 | 6/2012 | Grohmann et al. | |
| 8,256,719 B2 | 9/2012 | Wood et al. | |
| 2006/0237596 A1 * | 10/2006 | Perez-Sanchez | 244/219 |
| 2008/0265089 A1 * | 10/2008 | Zeumer | 244/99.3 |
| 2009/0212158 A1 * | 8/2009 | Mabe et al. | 244/1 N |
| 2010/0000991 A1 * | 1/2010 | Henry et al. | 219/679 |
| 2010/0133387 A1 * | 6/2010 | Wood et al. | 244/219 |

OTHER PUBLICATIONS

U.S. Appl. No. 12/505,061, filed Jul. 17, 2009, Pitt et al.
Robertson et al., "Texture in Tubes and Plates of the Superelastic/Shape-Memory Alloy Nitinol", Proceedings of the Shape Memory and Superelastic Technologies Conference 2003 (SMST 2003), SMST Society, Inc., Menlo Park CA 2003, pp. 1-6.
Office Action dated Dec. 20, 2012 regarding USPTO U.S. Appl. No. 12/505,061, 24 pages.

* cited by examiner

*Primary Examiner* — John W Eldred
*Assistant Examiner* — Benjamin Gomberg
(74) *Attorney, Agent, or Firm* — Yee & Associates, P.C.

(57) ABSTRACT

A method and apparatus for managing a flight control surface system. A leading edge section on a wing of an aircraft is extended into a deployed position. A deformable section connects the leading edge section to a trailing section. The deformable section changes from a deformed shape to an original shape when the leading edge section is moved into the deployed position. The leading edge section on the wing is moved from the deployed position to an undeployed position. The deformable section changes to the deformed shape inside of the wing.

23 Claims, 10 Drawing Sheets

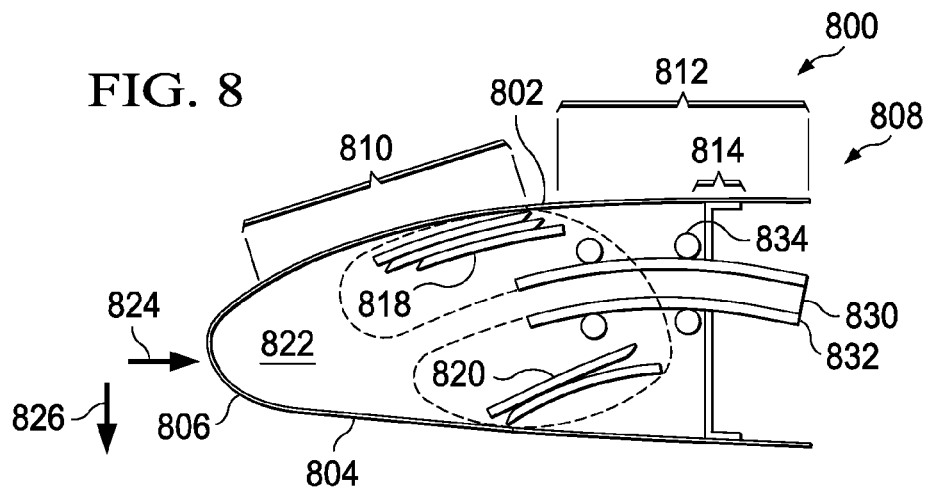
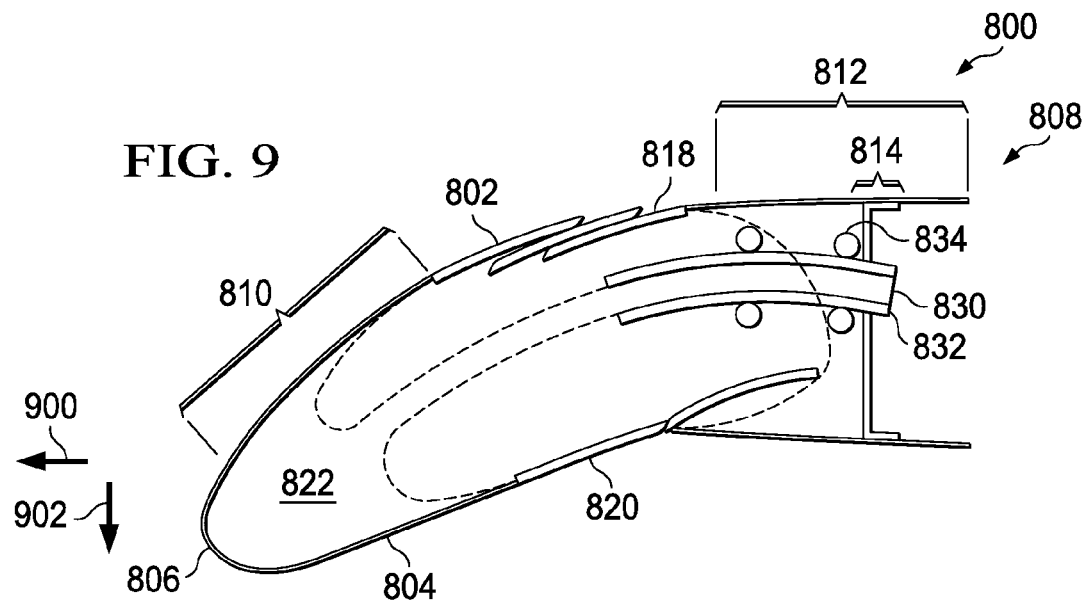

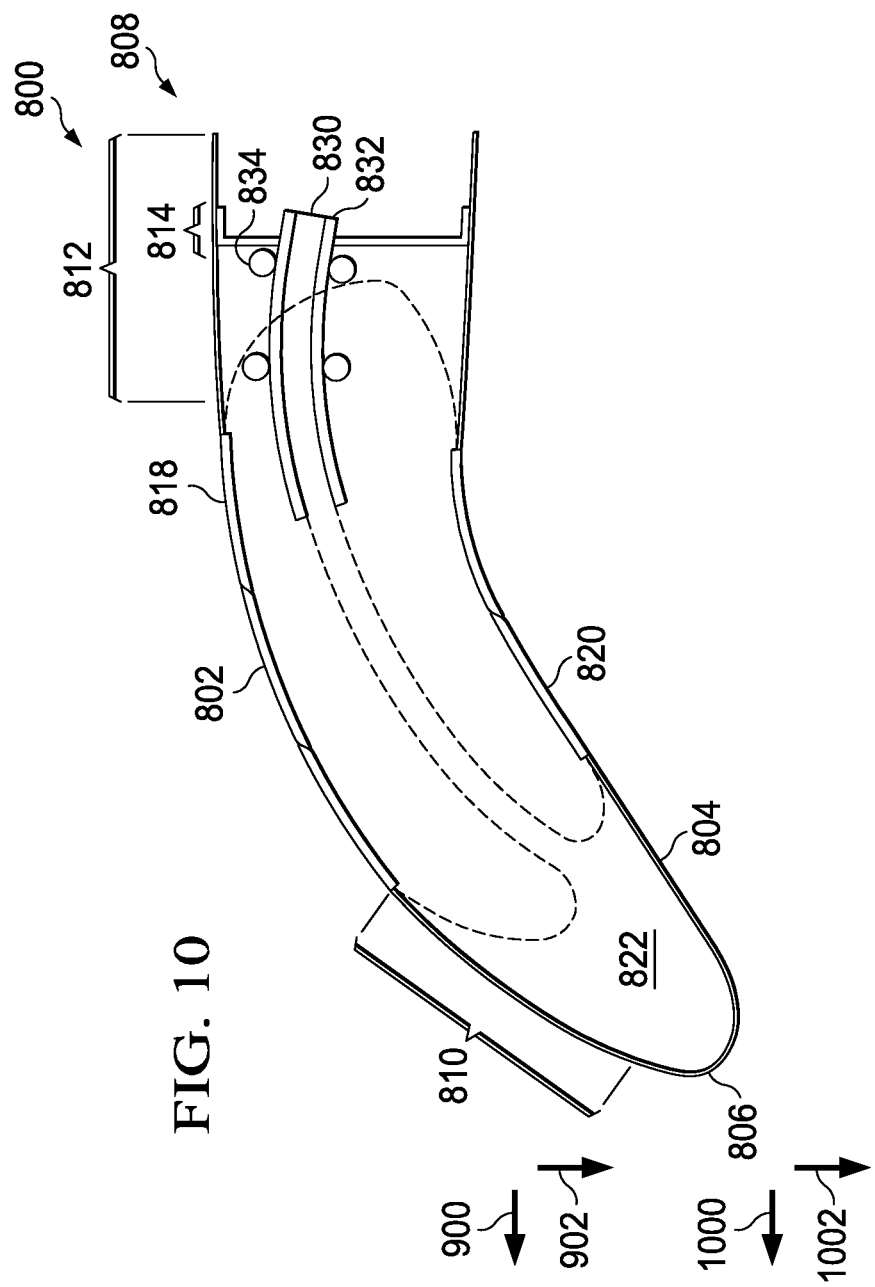

MOVEABLE LEADING EDGE DEVICE FOR A WING

LICENSE RIGHTS

The invention described herein was made in the performance of work under NASA Contract No. NAS1-NNL04AA11B TASK NNL08AD73T and is subject to the provisions of Section 305 of the National Aeronautics and Space Act of 1958 (72 Stat. 435: 42 U.S.C. 2457).

CROSS REFERENCE TO RELATED APPLICATION

The present disclosure is related to the following patent application: entitled "Method and Apparatus for a Leading Edge Slat on a Wing of an Aircraft", Ser. No. 12/505,061; filed even date hereof, assigned to the same assignee, and incorporated herein by reference.

BACKGROUND INFORMATION

1. Field:

The present disclosure relates generally to aircraft and, in particular, to control surfaces for aircraft. Still more particularly, the present disclosure relates to a method and apparatus for a leading edge device on a wing of an aircraft.

2. Background:

The wings of an aircraft are designed to generate lift as the aircraft moves. The configuration of a wing during flight at a cruising altitude may provide less lift at slower speeds when the aircraft is landing as control surfaces are used to change the configuration of an aircraft to provide lift augmentation.

Leading edge devices are commonly used to provide this additional lift. Leading edge devices are extensions of the front of a wing. These devices are used to reduce a stalling speed by altering the airflow over the wing.

An example of a leading edge device is a slat. Slats may be fixed or moveable. A retractable slat, as commonly used in commercial aircraft, provides for a reduced stalling speed at takeoff and landing. These slats are retracted for cruising to provide increased performance. An example of other control surfaces that are used to increase lift during takeoffs and landings are trailing devices, such as flaps.

Although these devices provide for increased lift during takeoff and landing, these types of devices may generate noise. Noise from aircraft is a public issue with respect to quality of life. Noise generated by aircraft during landings and takeoffs have impacts on areas around and nearby airports. With these concerns and legislative controls, aircraft manufacturers and operators have developed and implemented quieter aircraft and better operating procedures.

Aircraft manufacturers have focused on many different aspects of noise generated by an aircraft. For example, manufacturers have developed high-bypass turbo fan engines, which are quieter than the turbo jet engines and low-bypass turbo fans in previous aircraft models. Additionally, manufacturers have focused on other noise generation sources in an aircraft. One source of noise is the deployment of leading edge devices and trailing devices, such as flaps and slats.

When a leading edge device, such as a slat, is extended to increase lift, the amount of noise generated by the aircraft may increase. This increase in noise may be generated by air passing over the slat and the gap between the slat and the wing.

One currently available solution involves using a leading edge flap, which provides reduced noise as compared to a slat that extends. This device, however, may reduce the amount of lift that can be generated as compared to using extendable slats.

Therefore, it would be advantageous to have a method and apparatus that takes into account one or more of the issues discussed above.

SUMMARY

In one advantageous embodiment, an apparatus comprises a leading edge section, a trailing section, and a deformable section. The deformable section connects the leading edge section to the trailing section. The deformable section has an original shape that is configured to deform when the leading edge section moves into an undeployed position. The original shape is configured to return substantially to the original shape when the leading edge section extends into a deployed position.

In another advantageous embodiment, a flight control surface system comprises a skin panel, a leading edge section, a flexible panel, and an actuator system. The skin panel is connected to a wing structure of an aircraft. The flexible panel is comprised of a shape memory alloy. The flexible panel has an original shape and is connected to the skin panel and the leading edge section. The skin panel, the flexible panel, and the leading edge section form a surface for the wing structure. The actuator system is connected to the leading edge section. The actuator system is configured to move and extend the leading edge section from an undeployed position to a deployed position and move the leading edge section back to the undeployed position. The flexible panel has the original shape when the leading edge section is deployed and has a deformed shape when the leading edge section is in the undeployed position. The skin panel in the original shape, the flexible panel, and the leading edge section cause a change in air flow that reduces a stalling speed of the aircraft in the deployed position as compared to the undeployed position.

In yet another advantageous embodiment, a method is present for managing a flight control surface system. A leading edge section on a wing of an aircraft is extended into a deployed position. A deformable section connects the leading edge section to a trailing section. The deformable section changes from a deformed shape to an original shape when the leading edge section is moved into the deployed position. The leading edge section on the wing is moved from the deployed position to an undeployed position. The deformable section changes to the deformed shape inside of the wing.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

FIG. 8 is an illustration of a surface control system in an undeployed position in accordance with an advantageous embodiment;

FIG. 9 is a diagram of a flight control surface system in a partially deployed state in accordance with an advantageous embodiment;

FIG. 10 is an illustration of a flight control surface system in a deployed position in accordance with an advantageous embodiment;

DETAILED DESCRIPTION

Figure 1:
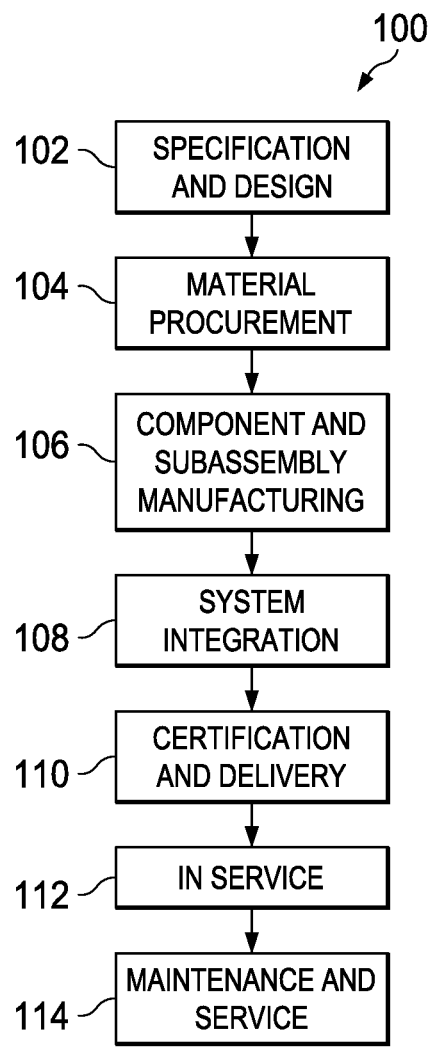
FIG. 1 is a diagram illustrating an aircraft manufacturing and service method in accordance with an advantageous embodiment.
Figure 2:
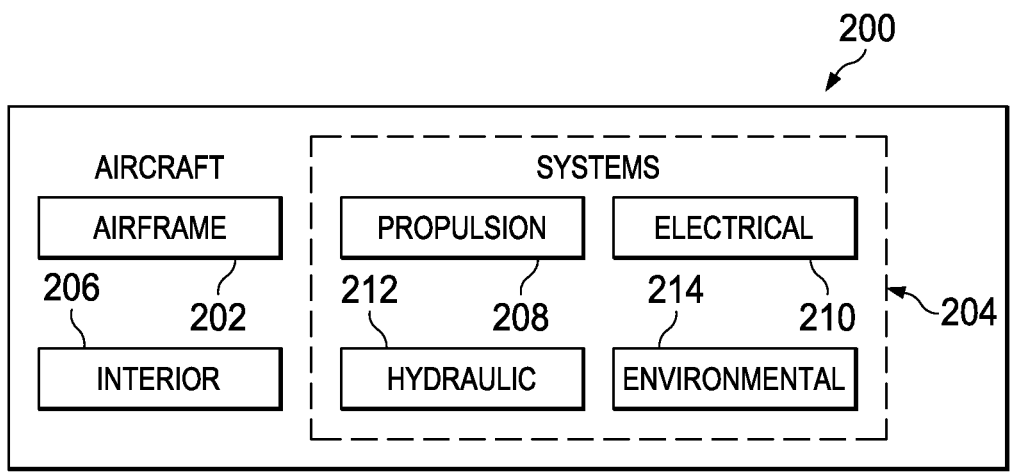
FIG. 2 is a diagram of an aircraft in which an advantageous embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, a diagram illustrating an aircraft manufacturing and service method is depicted in accordance with an advantageous embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, a diagram of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during at least one of the stages of aircraft manufacturing and service method 100 in FIG. 1. As used herein, the phrase "at least one of", when used with a list of items, means that different combinations of one or more of the listed items may be used and only one of each item in the list may be needed. For example, "at least one of item A, item B, and item C" may include, for example, without limitation, item A, or item A and item B. This example also may include item A, item B, and item C, or item B and item C.

In one illustrative example, components or subassemblies produced in component and subassembly manufacturing 106 in FIG. 1 may be fabricated or manufactured in a manner similar to components or subassemblies produced while aircraft 200 is in service 112 in FIG. 1. As yet another example, number of apparatus embodiments, method embodiments, or a combination thereof may be utilized during production stages, such as component and subassembly manufacturing 106 and system integration 108 in FIG. 1.

A number, when referring to items, means one or more items. For example, a number of apparatus embodiments is one or more apparatus embodiments. A number of apparatus embodiments, method embodiments, or a combination thereof may be utilized while aircraft 200 is in service 112 and/or during maintenance and service 114 in FIG. 1. The use of a number of the different advantageous embodiments may substantially expedite the assembly of or reduce the cost of aircraft 200.

The different advantageous embodiments recognize and take into account a number of different considerations. For example, the different advantageous embodiments recognize and take into account that noise that may be generated by a leading edge device is not just caused by the gap between the leading edge device and the wing when the leading edge device is extended.

The different advantageous embodiments recognize and take into account that the inner surfaces or coves of leading edge devices, such as slats, have strong vortex recirculation regions. In other words, the air may circulate in a circular vortex-type shape increasing the amount of noise when the slat is extended during landings and takeoffs. The different advantageous embodiments recognize and take into account that changing the design of a slat to reduce or eliminate this air recirculation on the inner surface of the slat may reduce noise.

Thus, the different advantageous embodiments provide a method and apparatus for leading edge devices used on platforms, such as aircraft. For example, in one advantageous embodiment, an apparatus comprises a leading edge section, a trailing section, and a deformable section. The deformable section connects the leading edge section to the trailing section. The deformable section has an original shape that is configured to deform when the leading edge section moves into an undeployed position and returns substantially to the original shape when the leading edge extends into a deployed position. The leading edge also may extend and lower into the deployed position.

The deformable section, in these examples, reduces and/or eliminates air that may travel to an inner surface of the leading edge device. More specifically, the deformable section provides a surface connecting the leading edge section and the trailing section in a manner that reduces or eliminates air travelling in a manner that recirculates.

Figure 3:
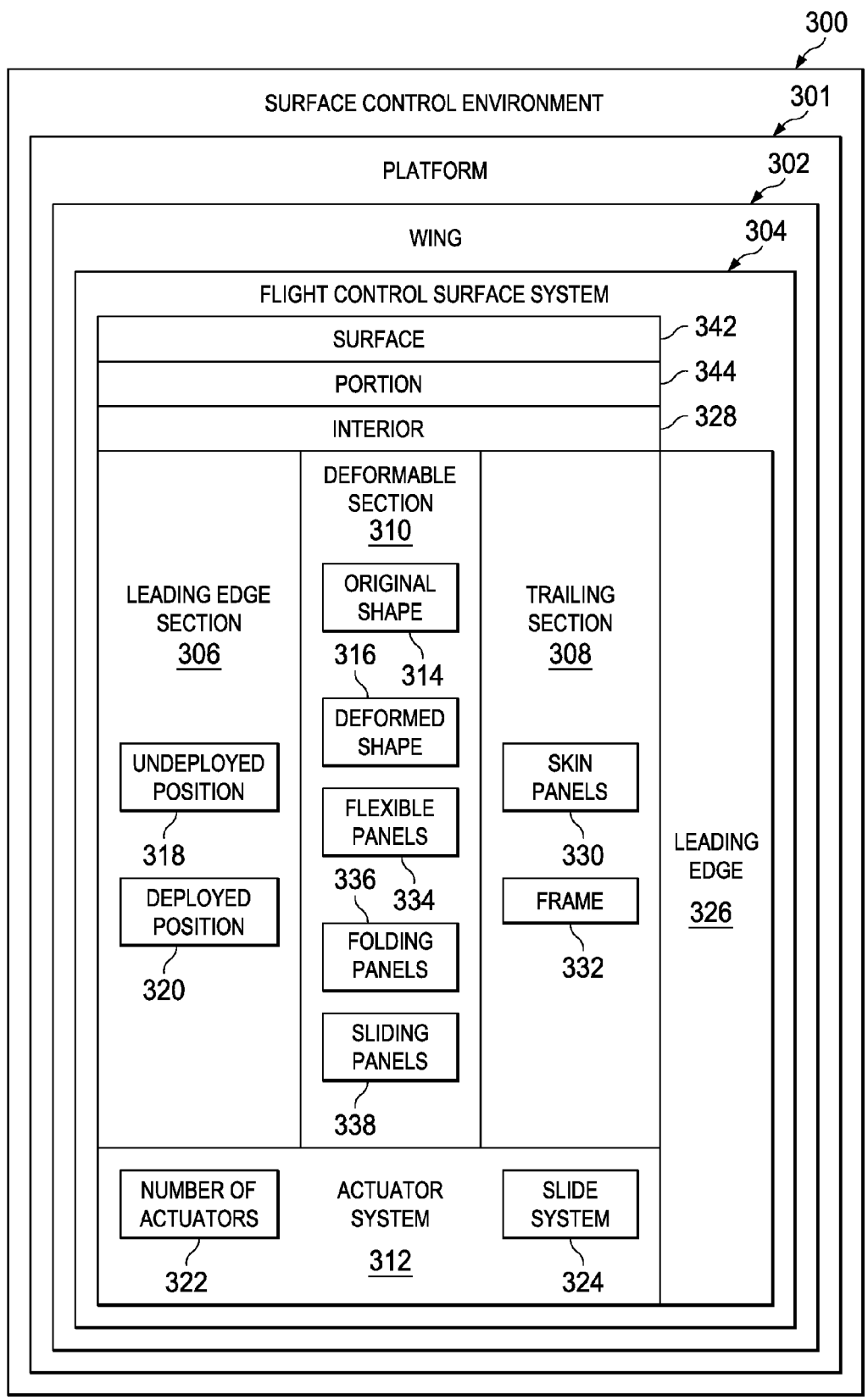
FIG. 3 is a block diagram of a surface control environment in accordance with one or more advantageous embodiments.

Turning now to FIG. 3, a block diagram of a surface control environment is depicted in accordance with one or more advantageous embodiments. In this illustrative example, surface control environment 300 is an example of a surface control environment that may be implemented in aircraft 200 in FIG. 2.

Surface control environment 300 may be implemented in platform 301. In these depicted examples, platform 301 takes the form of aircraft 200 in FIG. 2. In yet other advantageous embodiments, platform 301 may take other forms. For example, without limitation, platform 301 may be a space shuttle or some other suitable type of vehicle that may require the use of leading edge devices to change lift. In this example, wing 302 is an example of a location where flight control surface system 304 may be located. In this illustrative example, flight control surface system 304 may replace normally used leading edge devices, such as slats.

In this illustrative example, flight control surface system 304 includes leading edge section 306, trailing section 308, deformable section 310, and actuator system 312. Leading edge section 306 is connected to trailing section 308 by deformable section 310.

Deformable section 310 has original shape 314 and may deform or change to deformed shape 316. Actuator system 312 moves leading edge section 306 between undeployed position 318 and deployed position 320. In these illustrative examples, actuator system 312 may include number of actuators 322 and slide system 324. In the depicted examples, number of actuators 322 may take the form of a number of linear actuators. Slide system 324 provides support for the movement of leading edge section 306 with respect to trailing section 308. Slide system 324 also may guide the movement of leading edge section 306 when leading edge section 306 is moved by number of actuators 322 between undeployed position 318 and deployed position 320.

Further, number of actuators 322 may cause leading edge section 306 to extend and/or lower relative to wing 302 when moving from undeployed position 318 and deployed position 320.

In these illustrative examples, slide system 324 is associated with trailing section 308. A first component may be considered to be associated with a second component by being secured to the second component, bonded to the second component, fastened to the second component, and/or connected to the second component in some other suitable manner. The first component also may be considered to be associated with the second component by being formed as part of and/or an extension of the second component.

Trailing section 308 may include, for example, without limitation, skin panels 330 and frame 332. In these examples, the different components in actuator system 312 may be associated with frame 332 within trailing section 308. In other words, frame 332 may function as an anchor or location to secure or attach number of actuators 322 and/or slide system 324. Frame 332 may include various structural components such as, for example, without limitation, a spar, a rib, and/or other suitable components.

In these illustrative examples, actuator system 312 may be implemented using currently available actuator systems or slats. In these illustrative examples, actuator system 312 may be implemented by modifying a currently available actuator system to move leading edge section 306 instead of a slat.

In these illustrative examples, deformable section 310 has deformed shape 316 when leading edge section 306 is in undeployed position 318. When leading edge section 306 moves to deployed position 320, deformable section 310 substantially returns to original shape 314. In these illustrative examples, leading edge section 306 is substantially adjacent to trailing section 308 when leading edge section 306 is in undeployed position 318.

Trailing section 308, in these examples, is part of wing 302. For example, trailing section 308 may be leading edge 326 of wing 302.

When leading edge section 306 is substantially adjacent to trailing section 308, airflow over wing 302 is increased for performance during normal flight other than landings or take-offs. In this configuration, deformable section 310 is deformed in a manner that deformable section 310 is located in interior 328. Interior 328 may be part of at least one of leading edge section 306 and trailing section 308.

In these illustrative examples, deformable section 310 may be comprised of a number of different types of structures. For example, deformable section 310 may be formed from at least one of flexible panels 334, folding panels 336, sliding panels 338, and other suitable types of structures. Panels within folding panels 336 may have hinges that connect folding panels 336 to each other. Further, springs, shape memory metal alloys, and/or other suitable mechanisms may be used to help folding panels 336 move to the desired shape from a deformed shape. Panels within sliding panels 338 may have tracks and rollers to allow the panels to slide relative to each other. Further, stops may be included to define a maximum extension between panels within sliding panels 338.

When deformable section 310 is implemented using flexible panels 334, flexible panels 334 may have a material selected from at least one of a shape memory alloy, nitinol, a nickel-titanium alloy, and other suitable materials. When a shape memory alloy is used, the shape memory alloy may be selected as one that has what is commonly termed as super elastic characteristics.

For example, a shape memory alloy may be selected that has a capability to retain or substantially retain an original shape from a deformed state when the mechanical load that causes the deformation is withdrawn. In some shape memory alloys, the recoverable strains may be on the order of around eight percent to around 10 percent. This type of recoverable strain is an example of one characteristic that may be used to identify a shape memory alloy as being super elastic.

In these illustrative examples, flexible panels 334 along with skin panels 330 form surface 342 for portion 344 of wing 302 when leading edge section 306 is in deployed position 320. When leading edge section 306 is moved into undeployed position 318, surface 342 is formed by leading edge section 306 and trailing section 308 with deformable section 310 being located in interior 328 of at least one of leading edge section 306 and trailing section 308. When flexible panels 334 are used, flexible panels 334 buckle or otherwise deform into folds or rolls that are located in interior 328.

When folding panels 336 are used, these folding panels may fold in a manner such that they are located in interior 328. Folding panels 336 may be moveably connected to each other to allow for folding and unfolding. When sliding panels 338 are used, these sliding panels may slide with respect to each other and may be retracted into interior 328 when leading edge section 306 is moved into undeployed position 318. These sliding panels may slide with respect to each other to become part of surface 342 when leading edge section 306 is moved into deployed position 320.

The illustration of surface control environment 300 in FIG. 3 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, one or more additional leading edge sections, in addition to leading edge section 306, may be present on wing 302. Further, in yet other advantageous embodiments, deformable section 310 may include a combination of different types of panels, such as folding panels 336 and sliding panels 338. In yet other advantageous embodiments, a small gap may be present between leading edge section 306 and trailing section 308 when leading edge section 306 is substantially adjacent to trailing section 308. This gap may be covered by a faring or seal extending from one of these two components.

In yet other advantageous embodiments, deformable section 310 in deformed shape 316 may prevent a gap from being present when leading edge section 306 is substantially adjacent to trailing section 308. In other words, leading edge section 306 does not have to touch trailing section 308 to be substantially adjacent to trailing section 308.

Figure 4:
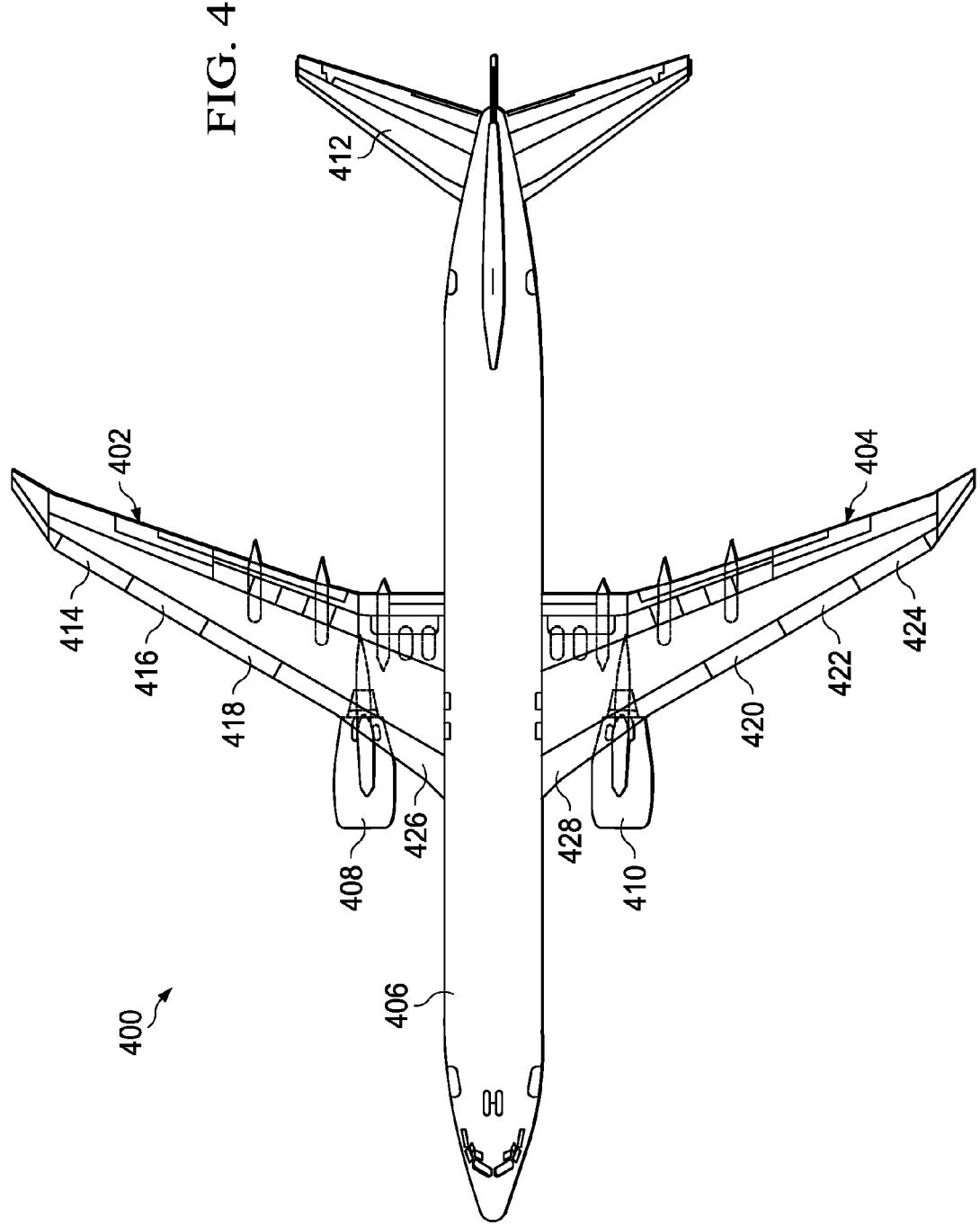
FIG. 4 is a diagram of an aircraft in which an advantageous embodiment may be implemented.

With reference to FIG. 4, a diagram of an aircraft is depicted in which an advantageous embodiment may be implemented. Aircraft 400 is an example of an aircraft in which a surface control system may be implemented. In this illustrative example, aircraft 400 has wings 402 and 404 attached to body 406. Aircraft 400 includes wing mounted engine 408, wing mounted engine 410, and tail 412.

In these illustrative examples, surface control environment 300 in FIG. 3 may be implemented to provide surface control systems for wing 402 and wing 404. For example, flight control surface systems 414, 416, 418, 420, 422, and 424 may be implemented on leading edges 426 and 428 of wings 402 and 404. These flight control surface systems may be implemented using flight control surface system 304 in FIG. 3. In some embodiments, all of these systems may be referred to collectively as a single flight control surface system.

Figure 5:
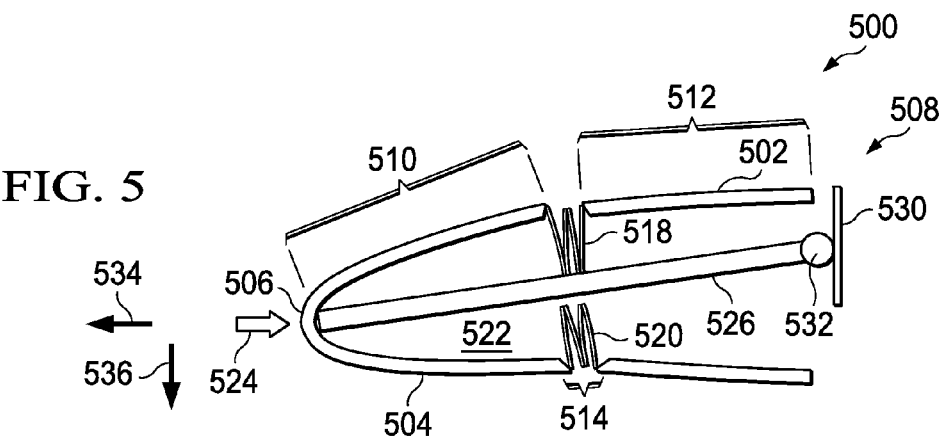
FIG. 5 is an illustration of a surface control system on a wing in accordance with an advantageous embodiment.
Figure 6:
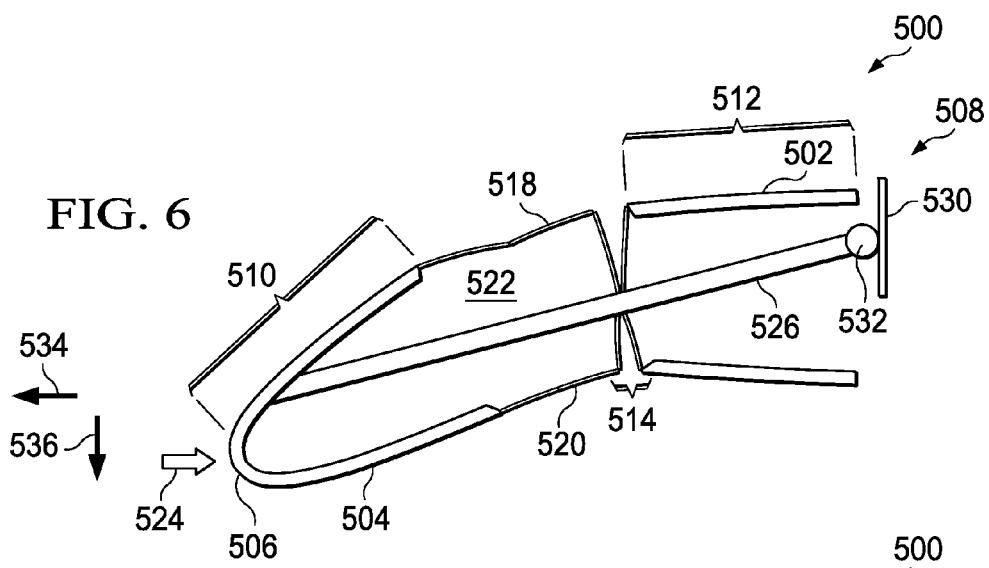
FIG. 6 is a diagram illustrating a partial extension of a leading edge section in a flight control surface system in accordance with an advantageous embodiment.
Figure 7:
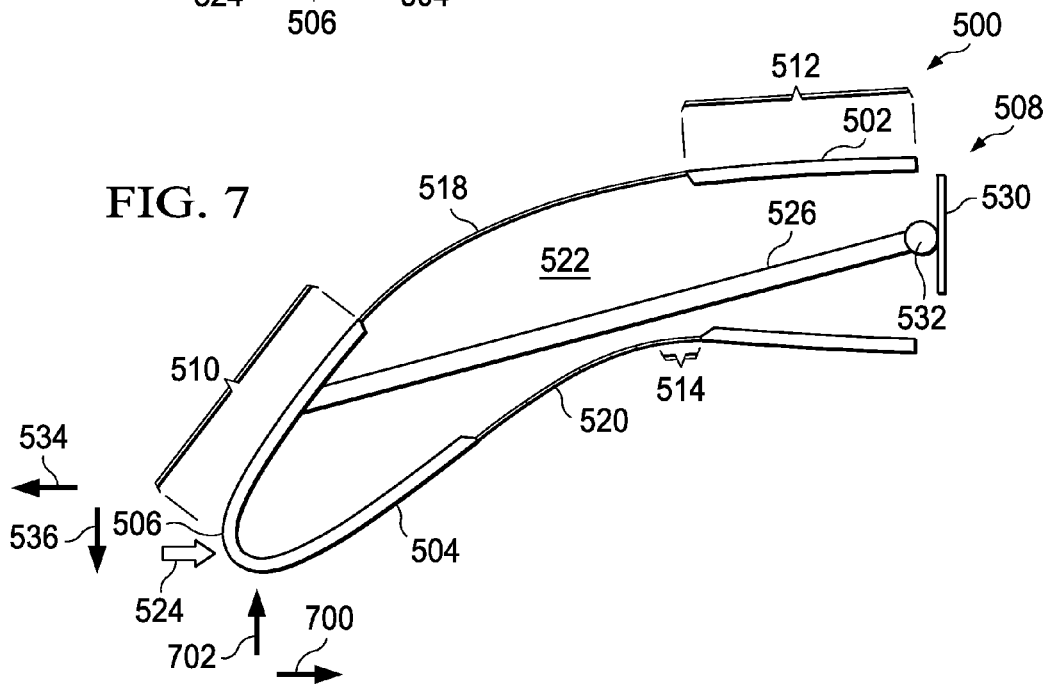
FIG. 7 is a diagram illustrating a flight control surface system in a deployed position in accordance with an advantageous embodiment.

With reference now to FIGS. 5-7, diagrams illustrating a portion of a wing using folding panels are depicted in accordance with an advantageous embodiment. The illustrative example in FIG. 5 is an illustration of a surface control system on a wing in accordance with an advantageous embodiment. In this illustrative example, a portion of wing 500 is illustrated. Wing 500 is shown in cross-section and may be an example of one implementation of wings 402 or 404 in FIG. 4.

Wing 500 has top surface 502 and bottom surface 504. This portion of wing 500 is shown with leading edge 506. In this example, flight control surface system 508 includes leading edge section 510, trailing section 512, and deformable section 514.

In this example, leading edge section 510 is shown in an undeployed position. Deformable section 514 connects leading edge section 510 to trailing section 512. As illustrated, deformable section 514 is comprised of folding panels 518 and 520. These panels are an example of one implementation of folding panels 336 in FIG. 3. As can be seen, folding panels 518 and 520 are in a deformed shape and located or stowed within interior 522 of at least one of leading edge section 510 and trailing section 512. As can be seen in this example, leading edge section 510 is substantially adjacent to trailing section 512. The deformation of folding panels 518 and folding panels 520 is caused by force 524 that is generated by moving leading edge section 510 into an undeployed position substantially adjacent to trailing section 512.

In this illustrative example, movement of leading edge section 510 is provided using linear actuator 526. In these examples, linear actuator 526 is connected to leading edge section 510 and frame 530. Linear actuator 526 is configured to pivot at point 532. Linear actuator 526 may extend in the direction of arrow 534 and may lower leading edge section 510 in the direction of arrow 536.

Linear actuator 526 may be implemented using any currently available or used linear actuator for moving slats in an aircraft. In some illustrative examples, linear actuator 526 may be selected or modified to move leading edge section 510 forward and downward farther than currently used slats. The particular type of actuator selected may vary, depending on the implementation.

Turning now to FIG. 6, a diagram illustrating a partial extension of a leading edge section in a flight control surface system is depicted in accordance with an advantageous embodiment. As can be seen in this example, leading edge section 510 has been partially extended away from trailing section 512. This extension is a movement in the direction of arrow 534 and in the direction of arrow 536. Force from linear actuator 526 removes strain from folding panels 518 and folding panels 520. As can be seen, folding panels 518 and folding panels 520 start to become undeformed or unfolded and are beginning to return to their original shapes.

Turning next to FIG. 7, a diagram illustrating a flight control surface system in a deployed position is depicted in accordance with an advantageous embodiment. In this example, leading edge section 510 is in a deployed position. Leading edge section 510 moves into a deployed position by being extended in the direction of arrow 534 and then lowered in the direction of arrow 536. With this type of movement, force 524 is generated by linear actuator 526 and removes the mechanical force or strain applied to folding panels 518 and folding panels 520.

As a result, these two panels return to substantially an original shape as shown in this example. This type of movement of leading edge section 510 may be referred to as an extension and drooping of leading edge section 510.

Leading edge section 510 may be returned to an undeployed position as shown in FIG. 5 by moving leading edge section 510 in the direction of arrow 700 and arrow 702. In other words, linear actuator 526 may move leading edge section 510 towards trailing section 512.

Additionally, linear actuator 526 may lift leading edge section 510 in the direction of arrow 702. This movement of folding panels 518 and folding panels 520 is the deformation of deformable section 514 in these illustrative examples. This deformation may be the deformation shown in FIG. 5.

This configuration of flight control surface system 508 may change the airflow over top surface 502 and bottom surface 504 of wing 500 in a manner that reduces the stalling speed of the wing. Further, this configuration also may provide for a lower amount of noise caused by air flowing over top surface 502 and bottom surface 504 as compared to currently used slats on the leading edges of wings. In this illustrative example, gaps are not present when leading edge section 510 is in the deployed position.

Consequently, vortexes and/or other types of undesirable movement of air on a back or interior surface of leading edge section 510 are reduced or eliminated. In this particular example, the exposed inner surface of a slat is no longer present. The use of folding panels 518 and folding panels 520 eliminates the gap that normally is present between leading edge section 510 and trailing section 512. In these examples, each panel within folding panels 518 and 520 may be moveably connected to another panel.

In this type of configuration, folding panels 518 may be connected to another panel with this configuration being used to connect the top surface of leading edge section 510 to the top surface of trailing section 512.

With reference now to FIGS. 8-10, diagrams illustrating another implementation for a flight control surface system using sliding panels are depicted in accordance with an advantageous embodiment. In FIG. 8, an illustration of a surface control system in an undeployed position is depicted in accordance with an advantageous embodiment. In this illustrative example, wing 800 is in a cross-sectional view of a portion of a wing, such as wings 402 or 404 in FIG. 4.

Wing 800 has top surface 802 and bottom surface 804. Leading edge 806 is shown in this portion of wing 800. In this example, flight control surface system 808 is an example of one implementation for flight control surface system 304 in FIG. 3. In this illustrative example, flight control surface system 808 includes leading edge section 810, trailing section 812, and deformable section 814.

Leading edge section 810 is substantially adjacent to trailing section 812. In this illustrative example, deformable section 814 is comprised of sliding panels 818 and 820 located in interior 822 of at least one of leading edge section 810 and trailing section 812 in wing 800. These panels are an example of one implementation of sliding panels 338 in FIG. 3.

In this illustrative example, an actuator, such as linear actuator 526 in FIG. 5, is not shown. Instead, slide system 830 is illustrated. Slide system 830 guides the movement of leading edge section 810 when an actuator moves leading edge section 810. In this example, slide system 830 includes track 832 and rollers 834. Track 832 may slide along rollers 834 during the extension of leading edge section 810.

Turning now to FIG. 9, a diagram of a flight control surface system in a partially deployed state is depicted in accordance with an advantageous embodiment. In this example, leading edge section 810 has been moved in the direction of arrow 900 and in the direction of arrow 902. In other words, leading edge section 810 has been extended and lowered. This movement of leading edge section 810 causes sliding panels 818 and sliding panels 820 to begin sliding with respect to each other.

Turning now to FIG. 10, an illustration of a flight control surface system in a deployed position is depicted in accordance with an advantageous embodiment. In this illustrative example, leading edge section 810 has been moved in the direction of arrows 1000 and 1002 to place leading edge section 810 in a deployed position. In this position, sliding panels 818 and 820 form part of top surface 802 and bottom surface 804. Gaps between leading edge section 810 and trailing section 812 may be reduced or avoided through the use of sliding panels 818 and 820 in deformable section 814.

This type of implementation for deformable section 814 in flight control surface system 808 also may reduce noise caused by air travelling over top surface 802 and bottom surface 804 when leading edge section 810 is in a deployed position.

Figure 11:
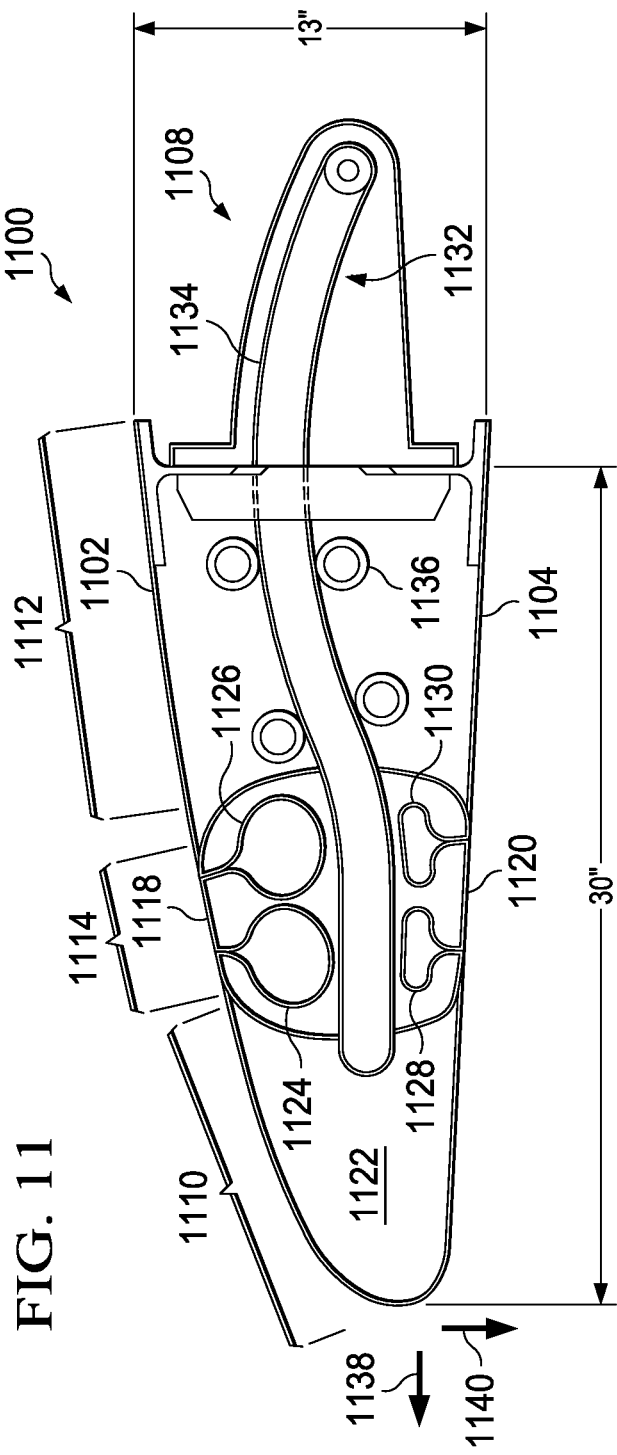
FIG. 11 is an illustration of a surface control system in a wing in accordance with an advantageous embodiment.
Figure 12:
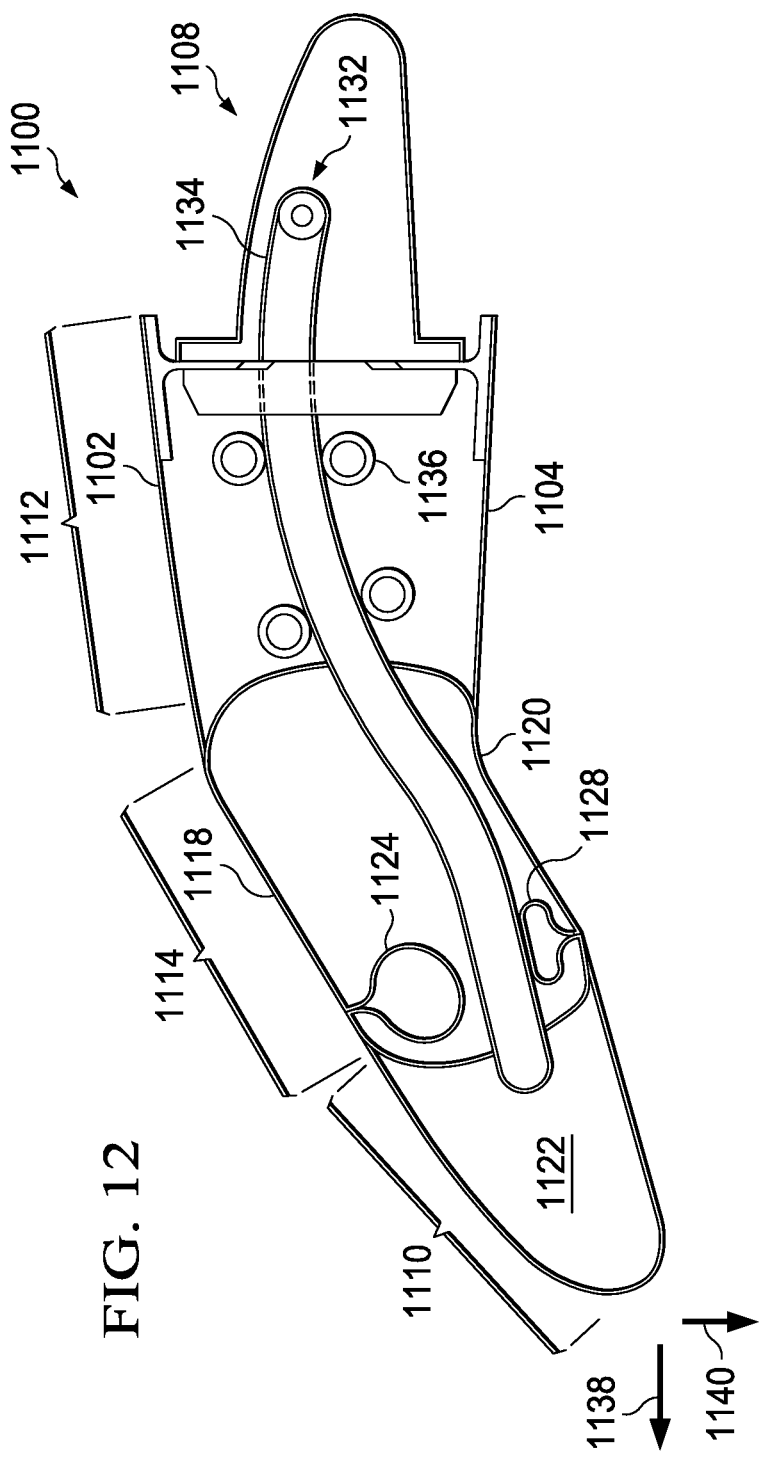
FIG. 12 is a diagram illustrating a partial extension of a leading edge section in a flight control surface system in accordance with an advantageous embodiment.
Figure 13:
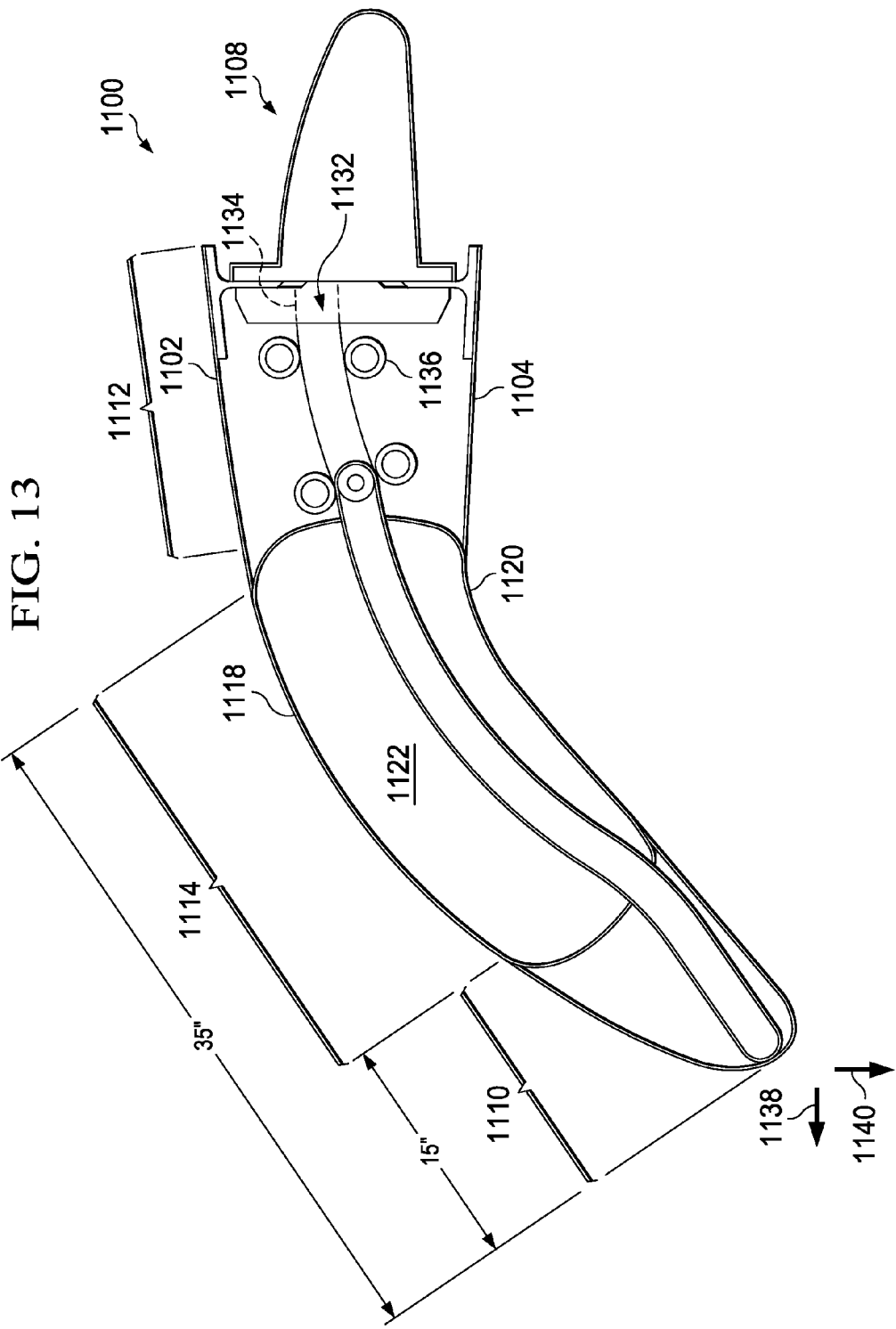
FIG. 13 is a diagram illustrating a flight control surface system in a deployed position in accordance with an advantageous embodiment.

With reference next to FIGS. 11-13, diagrams illustrating a portion of a wing using flexible panels are depicted in accordance with an advantageous embodiment. With reference first to FIG. 11, an illustration of a flight control surface system for a wing is depicted in accordance with an advantageous embodiment. In this depicted example, a portion of wing 1100 is illustrated. Wing 1100 is shown in cross section and may be an example of one implementation of wings 402 or 404 in FIG. 4.

Wing 1100 has top surface 1102 and bottom surface 1104. In this particular example, flight control surface system 1108 includes leading edge section 1110, trailing section 1112, and deformable section 1114.

As illustrated, leading edge section 1110 is depicted in an undeployed position. Deformable section 1114 connects leading edge section 1110 to trailing section 1112. In this example, deformable section 1114 is comprised of flexible panels 1118 and 1120. These panels are an example of one implementation of flexible panels 334 in FIG. 3. Flexible panels 1118 and 1120 are in a deformed shape and located within interior 1122 of at least one of leading edge section 1110 and trailing section 1112. In this example, leading edge section 1110 is substantially adjacent to trailing section 1112. Further, in this illustrative example, flexible panels 1118 and flexible panels 1120 deform in a manner to form rolls 1124 and 1126 in flexible panels 1118 and rolls 1128 and 1130 in flexible panels 1120.

In this cross-sectional view, slide system 1132 may support leading edge section 1110 during movement between the undeployed position to a deployed position. In this example, slide system 1132 includes rail 1134 and rollers 1136. Rail 1134 may slide along rollers 1136 to move leading edge section 1110 in the direction of arrow 1138 and downward in the direction of arrow 1140 relative to wing 1100.

With reference now to FIG. 12, a diagram illustrating a partial extension of a leading edge section in a flight control surface system is depicted in accordance with an advantageous embodiment. In this illustration, leading edge section 1110 has been partially extended away from trailing section 1112. This movement of leading edge section 1110 is in the direction of arrow 1138 and in the direction of arrow 1140.

Force generated by the movement of rail 1134 removes strain from flexible panels 1118 and 1120. As can be seen, flexible panels 1118 and flexible panels 1120 have partially returned to their original shapes. In this example, only roll 1124 in flexible panels 1118 and roll 1128 in flexible panels 1120 remain. Roll 1126 in flexible panels 1118 and roll 1130 in flexible panels 1120 are no longer present.

Turning now to FIG. 13, a diagram illustrating a flight control surface system in a deployed position is depicted in accordance with an advantageous embodiment. In this illustrative example, leading edge section 1110 has moved into the deployed position. Flexible panels 1118 and 1120 have substantially returned to their original shape.

The illustrations of the flight control surface systems in FIGS. 5-13 have been provided for purposes of showing only a few possible implementations out of the many possible implementations for a flight control surface system in accordance with one or more of the advantageous embodiments. These illustrations are not meant to imply physical or architectural limitations to the manner in which other advantageous embodiments may be implemented. In some advantageous embodiments, combinations of different types of panels may be employed, and other numbers of panels other than those shown may be used.

Further, slide system 830 and linear actuator 526 may be used in both of the advantageous embodiments illustrated in these figures. For example, other portions of wing 500 may include slide systems such as, for example, slide system 830. Other portions of wing 800 may include linear actuators, such as linear actuator 526.

Figure 14:
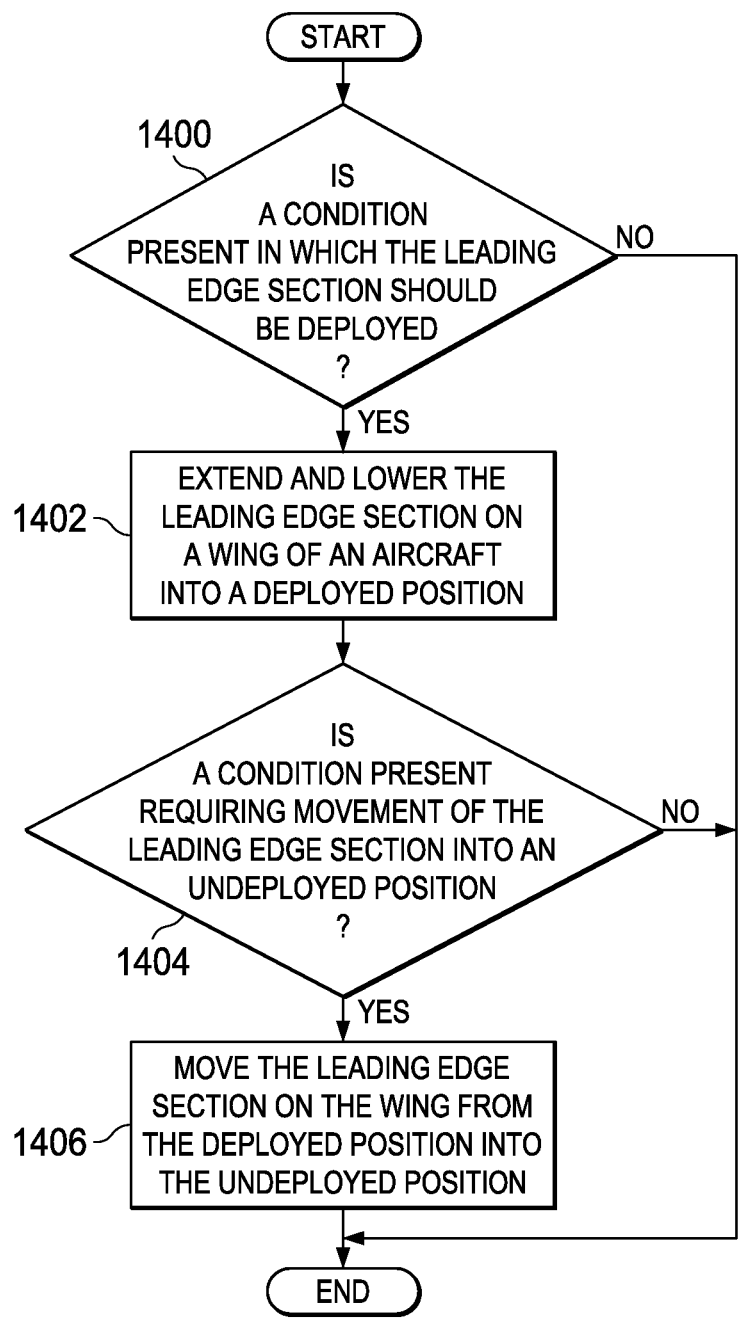
FIG. 14 is a flowchart of a process for managing a flight control surface system in accordance with an advantageous embodiment.

Turning now to FIG. 14, a flowchart of a process for managing a flight control surface system is depicted in accordance with an advantageous embodiment. The process illustrated in FIG. 14 may be implemented in surface control environment 300 using flight control surface system 304 in FIG. 3.

The process begins by determining whether a condition is present in which the leading edge section should be deployed (operation 1400). This condition may be preparation for a takeoff or a landing of an aircraft. If the condition is not present, the process terminates.

If a condition is present that requires deployment of the leading edge section, the process extends and lowers the leading edge section on a wing of an aircraft into a deployed position (operation 1402). A deformable section connects the leading edge section to a trailing section. The deformable section changes from a deformed shape to an original shape, and the leading edge section is moved into the deployed position. In these illustrative examples, the movement of the leading edge section is an extension and lowering of the leading edge section with respect to the wing. Of course, in some advantageous embodiments, the leading edge section may only be extended without lowering the section.

A determination is then made as to whether a condition is present requiring movement of the leading edge section into an undeployed position (operation 1404). If a condition requiring movement of the leading edge section into an undeployed position is present, the leading edge section on the wing is moved from the deployed position into the undeployed position (operation 1406). This movement of the leading edge section causes the deformable section to change to the deformable shape and move into the interior of the wing, with the process terminating thereafter.

With reference again to operation 1404, if a condition is not present requiring movement of the leading edge section from the deployed position to the undeployed position, the process also terminates.

The flowchart and block diagrams in the different depicted embodiments illustrate the architecture, functionality, and operation of some possible implementations of apparatus and methods in different advantageous embodiments. In this regard, each block in the flowchart or block diagrams may represent a module, segment, function, and/or a portion of an operation or step. In some alternative implementations, the function or functions noted in the blocks may occur out of the order noted in the figures. For example, in some cases, two blocks shown in succession may be executed substantially concurrently, or the blocks may sometimes be executed in the reverse order, depending upon the functionality involved.

Thus, the different advantageous embodiments provide a method and apparatus for a flight control surface system. In one or more of the different advantageous embodiments, an apparatus comprises a leading edge section, a trailing section, and a deformable section. The deformable section connects the leading edge section to the trailing section. The deformable section has an original shape as configured to deform when the leading edge section moves into an undeployed position. The deformable section is configured to return substantially to the original shape when the leading edge section extends and lowers into a deployed position.

In this and other advantageous embodiments, the level or amount of noise that occurs when a leading edge device is deployed is reduced as compared to currently used leading edge devices, such as slats. In the different advantageous embodiments, the air circulation that is present behind the inner surface of the slats when deployed is reduced or eliminated through the use of a deformable section, such as deformable panels, sliding panels, folding panels, or other suitable devices.

The description of the different advantageous embodiments has been presented for purposes of illustration and description, and it is not intended to be exhaustive or limited to the embodiments in the form disclosed. Many modifications and variations will be apparent to those of ordinary skill in the art. Further, different advantageous embodiments may provide different advantages as compared to other advantageous embodiments.

The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   a leading edge section;
   a trailing section, the trailing section comprising an upper skin and a lower skin, the leading edge section and the upper skin being discontinuous, the leading edge section and the lower skin being discontinuous; and
   a deformable section connecting the leading edge section to the trailing section, the deformable section comprising an upper deformable section and a lower deformable section, the upper deformable section positioned between the leading edge section and the upper skin, the lower deformable section positioned between the leading edge section and the lower skin, wherein the deformable section has an original shape that is configured to deform when the leading edge section moves into an undeployed position and to return substantially to the original shape when the leading edge section extends into a deployed position, wherein at least a portion of the upper deformable section and a portion of the lower deformable section are positioned in an interior of the leading edge section, the trailing section, or both the leading edge section and the trailing section, in the undeployed position.

2. The apparatus of claim 1 further comprising:
   an actuator system configured to move the leading edge section between the undeployed position and the deployed position.

3. The apparatus of claim 1, wherein the deformable section comprises a number of flexible panels.

4. The apparatus of claim 1, wherein the upper deformable section comprises a first flexible panel and the lower deformable section comprises a second flexible panel.

5. The apparatus of claim 4, wherein the first flexible panel and the second flexible panel are comprised of a material selected from one of a shape memory alloy, nitinol, and a nickel-titanium alloy.

6. The apparatus of claim 1 further comprising:
   an aircraft, wherein the leading edge section, the trailing section, and the deformable section are part of a wing on the aircraft and cause a change in airflow that reduces a stalling speed of the aircraft in the deployed position as compared to the undeployed position.

7. The apparatus of claim 1 further comprising:
   a wing, wherein the leading edge section, the trailing section, and the deformable section connecting the leading edge section to the trailing section are part of the wing.

8. The apparatus of claim 2, wherein the actuator system comprises:
   a number of actuators; and
   a slide system.

9. The apparatus of claim 1, wherein the deformable section has the original shape that is configured to deform when the leading edge section moves into the undeployed position and to return substantially to the original shape when the leading edge section extends and lowers into the deployed position.

10. The apparatus of claim 1 further comprising:
a platform, wherein the leading edge section, the trailing section, and the deformable section are associated with the platform.

11. The apparatus of claim 10, wherein the platform is selected from one of a mobile platform, an aircraft, and a spacecraft.

12. A flight control surface system comprising:
a skin panel connected to a wing structure of an aircraft;
a leading edge section, the skin panel comprising an upper skin and a lower skin, the leading edge section and the second upper skin being discontinuous, the leading edge section and the lower skin being discontinuous;
a flexible panel comprised of a shape memory alloy, wherein the flexible panel has an original shape and is connected to the skin panel and the leading edge section, the flexible panel comprising an upper deformable section and a lower deformable section, the upper deformable section positioned between the leading edge section and the upper skin, the lower deformable section positioned between the leading edge section and the lower skin, wherein the skin panel, the flexible panel, and the leading edge section form a surface for the wing structure; and
an actuator system connected to the leading edge section, wherein the actuator system is configured to move and extend the leading edge section from an undeployed position to a deployed position and move the leading edge section back to the undeployed position, wherein the flexible panel has the original shape when the leading edge section is deployed and has a deformed shape when the leading edge section is in the undeployed position, and wherein the skin panel in the original shape, the flexible panel, and the leading edge section cause a change in air flow that reduces a stalling speed of the aircraft in the deployed position as compared to the undeployed position, wherein at least a portion of the upper deformable section and a portion of the lower deformable section are positioned in an interior of the leading edge section, the trailing section, or both the leading edge section and the trailing section, in the undeployed position.

13. The flight control surface system of claim 12, wherein the shape memory alloy is comprised of a material selected from one of nitinol and a nickel-titanium alloy.

14. A method for managing a flight control surface system, the method comprising:
extending a leading edge section on a wing of an aircraft into a deployed position, a deformable section connecting the leading edge section to a trailing section, the trailing section comprising an upper skin and a lower skin, the leading edge section and the upper skin being discontinuous, the leading edge section and the lower skin being discontinuous, and wherein the deformable section changes from a deformed shape to an original shape when the leading edge section is moved into the deployed position, the deformable section comprising an upper deformable section and a lower deformable section, the upper deformable section positioned between the leading edge section and the upper skin, the lower deformable section positioned between the leading edge section and the lower skin; and
moving the leading edge section on the wing from the deployed position to an undeployed position, wherein the deformable section changes to the deformed shape inside of the wing, wherein at least a portion of the upper deformable section and a portion of the lower deformable section are positioned in an interior of the leading edge section, the trailing section, or both the leading edge section and the trailing section, in the undeployed position.

15. The method of claim 14, wherein the leading edge section is moved using an actuator system.

16. The method of claim 14, wherein the deformable section comprises at least one of a number of flexible panels, a plurality of folding panels configured to fold with respect to each other, and a plurality of sliding panels configured to slide with respect to each other.

17. The method of claim 14, wherein the upper deformable section comprises a first flexible panel and the lower deformable section comprises a second flexible panel.

18. The method of claim 17, wherein the first flexible panel and the second flexible panel are comprised of a material selected from a shape memory alloy, nitinol, and a nickel-titanium alloy.

19. The method of claim 14, wherein the leading edge section is moved into the deployed position during a landing phase of flight.

20. The method of claim 14, wherein the leading edge section is moved into the deployed position to cause a change in airflow that reduces a stalling speed of an aircraft in the deployed position as compared to the undeployed position.

21. The method of claim 14, wherein the step of extending the leading edge section on the wing of the aircraft into the deployed position comprises:
extending and lowering the leading edge section on the wing of the aircraft into the deployed position.

22. The apparatus of claim 1, wherein the deformable section comprises a plurality of folding panels configured to fold with respect to each other.

23. The apparatus of claim 1, wherein the deformable section comprises a plurality of sliding panels configured to slide with respect to each other.

* * * * *